Dec. 31, 1940.   P. FROST   2,226,602
AUTOMATIC SETTING DEVICE FOR SHUTTERS AND
DIAPHRAGMS OF PHOTOGRAPHIC APPARATUS
Filed Jan. 18, 1938
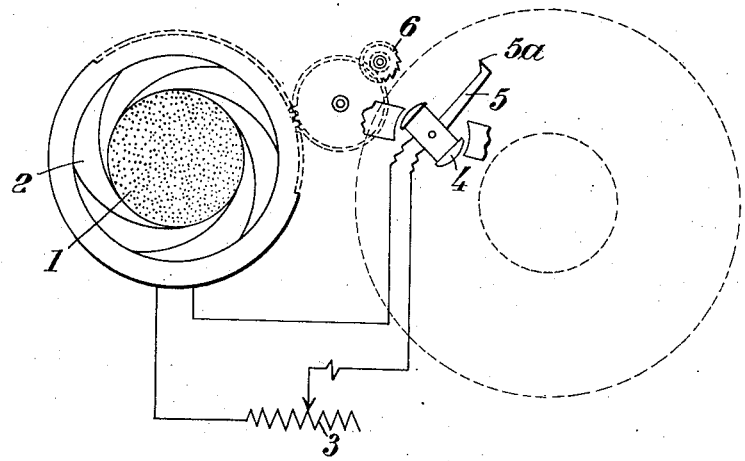
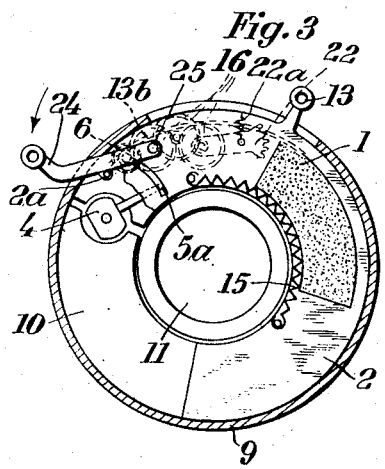
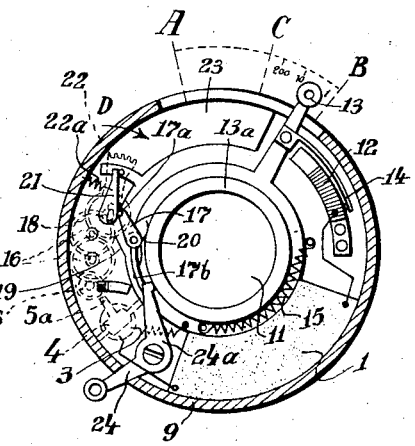
Inventor
Paul Frost
By His Attorney
Philip S. Hopkins Patented Dec. 31, 1940

2,226,602

UNITED STATES PATENT OFFICE 2,226,602

AUTOMATIC SETTING DEVICE FOR SHUTTERS AND DIAPHRAGMS OF PHOTOGRAPHIC APPARATUS

Paul Frost, Munich-Neuharlaching, Germany, assignor, by mesne assignments, to General Aniline & Film Corporation, New York, N. Y., a corporation of Delaware Application January 18, 1938, Serial No. 185,507
In Germany January 18, 1937

4 Claims. (Cl. 95—53)

My present invention relates to a setting device for shutters and diaphragms of photographic apparatus.

On of its objects is the provision of an improved device for automatically setting the shutter and the diaphragm of photographic apparatus with the aid of a photoelectric device. Further objects of the invention will be apparent from the following detailed description.

Reference is made to the accompanying drawing, in which

Figure 1 is a circuit diagram of the new setting apparatus;

Figure 2 is a detail view of the pointer of the galvanometer acting as a pawl;

Figure 3 shows the housing of the sector shutter in which a rectifier photocell, a photocell diaphragm and a galvanometer are constructed, and Figure 4 shows the setting mechanism constructed in the shutter housing with a photocell resistance, photocell and galvanometer.

It has been proposed to set the diaphragm of a photographic shutter by a setting device controlled with the aid of a contact galvanometer, an auxiliary source of current and a relay. It has also been proposed to use the index of a photoelectric measuring apparatus as a diaphragm. Neither apparatus is adapted for construction in a photographic camera because if an auxiliary current source and photoelectric relay are used the size and cost of the camera are increased to an inconvenient extent, and if a rotating coil instrument of which the index is formed as the diaphragm of the objective is used, the index is so sensitive that even the least movement or vibration of the camera produces a movement of the diaphragm.

By this invention the problem of automatic setting of the shutter or diaphragm is solved in a different way; the shutter or diaphragm is operated by setting mechanism which also operates means for reducing the current in the circuit of a photoelectric cell, and is automatically stopped in its setting motion by the index of a device responsive to electric current (hereinafter referred to as a galvanometer) at a position dependent on the position of the said index. The setting mechanism is preferably a delayed action mechanism operated by the tensioning spring of the shutter and running under retardation. The setting mechanism, the photocell, the means for reducing the current and the galvanometer can all be constructed in the shutter housing. The index of the galvanometer, which, owing to the gradual reduction of the photoelectric current, returns sooner or later, according to the prevailing intensity of light, to its zero position, may be formed in such a manner that it can engage in a stop wheel of the setting mechanism without straining its bearings.

In front of the rectifier photocell 1 is a diaphragm 2 for adjusting the aperture of the cell. A variable resistance 3 can be adjusted to suit the sensitivity of the photographic material, the aperture of the objective diaphragm, the effect of a filter or the like. A moving coil galvanometer 4 is in the circuit of the photocell 1 and has a pointer 5 of which the free end 5a is hooked and extends into the path of the stop of a stop wheel 6. The pointer has the form of a double loop 5b and its free end 5a moves between fixed bars 7 which prevent pressure being exerted on the bearings 8 of the pointer when its end engages in the teeth of the stop wheel 6.

Figure 3 shows the shutter housing 9, in which the magnet 10 of the galvanometer 4, the photocell 1 and the photocell diaphragm 2 are arranged concentrically with the opening 11 for the objective. Instead of the diaphragm 2 there may be used a resistance 12 (Figure 4) connected in the photocell circuit in series with the resistance 3. By the invention the diaphragm 2 or the resistance 12 is adjusted directly by the setting lever 13 of the shutter either by a flexible rider 14 sliding on the winding of the resistance 12 and fixed to the lever 13 (see Figure 4), or by virtue of the diaphragm 2 being integral with the lever 13 (see Figure 3). The lever 13 is, in known manner, under the tension of a strong spring 15 which tensions the shutter and the setting mechanism 16. The setting mechanism 16 consists in a train of gear wheels which run against a retarding action and (in the device of Figure 4) are driven by a pawl 17 carried by the annular portion 13a of the lever 13 which pawl engages a ratchet 18 during the tensioning of the shutter. On the pawl 17 there is a pin 17a, which slides on a cam surface 19 when the mechanism is in motion, and during the setting movement restrains the pawl 17, against the action of a spring 20, from accidental engagement with the mechanism 16. On the axle of the wheel 18 there is mounted a lever 21 which is connected with the toothed sector 22 of the shutter speed controlling device 23. The usual spring 22a normally urges sector 22 to the left to its original starting position. The pointer 5, 5a of the galvanometer engages with the fastest running wheel of the setting mechanism 16, namely the stop wheel 6. At the desired moment, the inner arm 24a of the release lever 24 lifts the pawl 17 from the ratchet teeth of the wheel 18 by means of the arm 17b. In an alternative construction the release lever 24 carries the bearing of the stop wheel 6 (see Figure 3), so that by pressing down the lever 24 it turns, together with the stop wheel 6, about the pivot 25, and the stop wheel is lifted from engagement with the internal teeth 13b of the tensioning ring 13a. In this modification the setting mechanism 16 is driven by these internal teeth, rather than by the pawl construction of Figure 4.

The operation of the apparatus is as follows: The shutter is set under tension by moving the lever 13 from the position A to the position B, whereby the diaphragm 2 is opened, or the resistance 12 is cut out of the photocell circuit since the diaphragm or the rider 14 is attached to the lever 13. The photocell current generated by the light incident upon the cell causes more or less deflection of the galvanometer pointer according to the brightness of the day. At the end of the movement of lever 13 the pawl 17, in the device of Figure 4, engages the ratchet 18 of the mechanism 16, and drives the setting mechanism. As the setting mechanism runs, the tension lever 13 moves gradually from B to C and the lever 21 moves in the direction of the arrow D, and thereby adjusts the speed of the shutter with the aid of the toothed sector 22. If the day is bright, the relatively strong photocell current will produce a large deflection of the galvanometer pointer, and the setting mechanism will accordingly run for a relatively long time before the pointer 5a engages in the stop wheel 6 of the setting mechanism so as to stop it. The shutter speed corresponding with the brightness of the day is thus adjusted automatically by the apparatus described above. The shutter can now be released at the desired moment by the release lever 24, whereupon the setting mechanism locked by the pointer 5a is disengaged by the lifting of the pawl 17 by means of the arm 17b.

Alternatively, it is possible to effect this disengagement by pivoting the stop wheel 6 as shown in Figure 3. In this modification the wheel 6 is mounted on the release lever 24, which is pivoted at 25. The lever 24 is held by a locking device in the release position until the pin 2a releases the lever 24 at the end of a new tensioning movement, so that the stop wheel 6 can again engage in the teeth 13b of the ring, and can be driven by said ring as the diaphragm closes, until the pointer 5a locks the stop wheel.

I claim:

1. In a photographic shutter, a photo-electric cell, a diaphragm for said cell, a shutter lever, means for tensioning the shutter, a galvanometer in electrical connection with said cell, a setting mechanism for controlling the diaphragm of said cell including a train of interconnected gears, teeth carried by one of said gears, a ratchet fixed on a gear of said train, a pawl on said shutter lever adapted to engage said ratchet to operate said train of gears, means for adjusting the speed of the shutter, means carried by a gear of said train for operating said last named means and a pointer on said galvanometer adapted to engage the teeth of said gear to stop the motion of said gear train.

2. In a photographic shutter, in combination with a controlling means for the exposure, an automatic setting device for regulating said controlling means comprising a photo-electric cell, a diaphragm for said cell, a setting mechanism for controlling said diaphragm and the exposure controlling means and including a toothed wheel, a galvanometer in electrical connection with said cell and a pointer carried by said galvanometer adapted to engage said toothed wheel for stopping said setting mechanism.

3. In a photographic shutter, in combination with a controlling means for the exposure, an automatic setting device for regulating said controlling means comprising a photo-electric cell, a diaphragm for said cell, a setting mechanism for controlling said diaphragm and the exposure controlling means including a toothed wheel, a galvanometer in electrical connection with said cell, a pointer carried by said galvanometer adapted to engage said toothed wheel for stopping said setting mechanism, and a resistance for reducing the current produced by said photoelectric cell.

4. In a photographic shutter, in combination with a shutter housing and a controlling means for the exposure, an automatic setting device for regulating the controlling means located in said housing and comprising a photo-electric cell, a diaphragm for said cell, a setting mechanism for controlling said diaphragm and the exposure controlling means and including a toothed wheel, a galvanometer in electrical connection with said cell and a pointer carried by said galvanometer adapted to engage said toothed wheel for stopping said setting mechanism.

PAUL FROST.